Aug. 7, 1923.
N. A. PETRY
HOSE CLAMP
Filed March 29, 1921
1,464,335
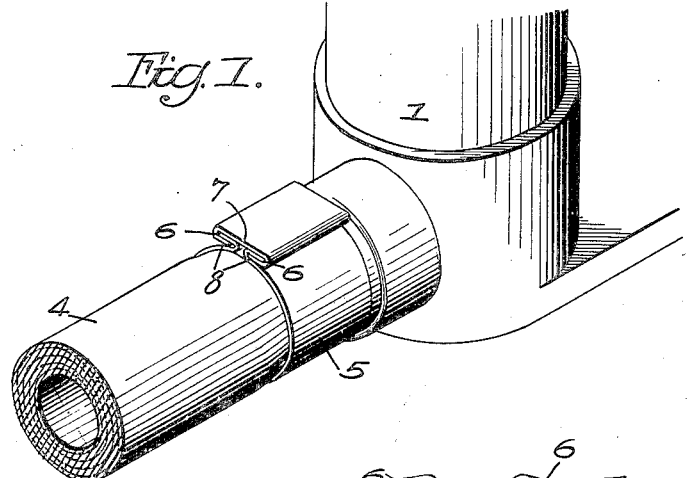
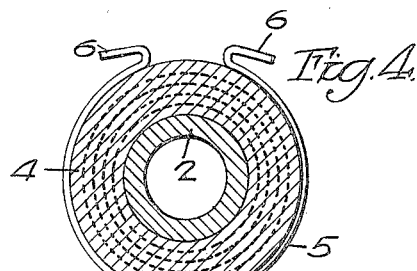
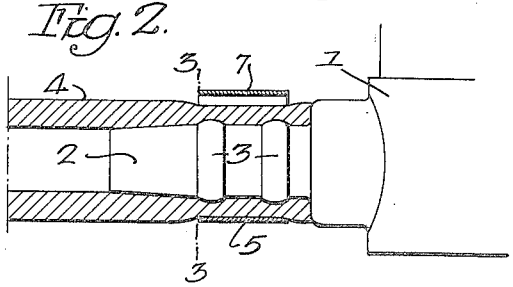
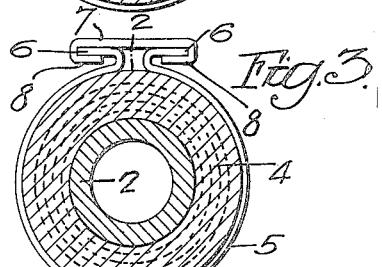
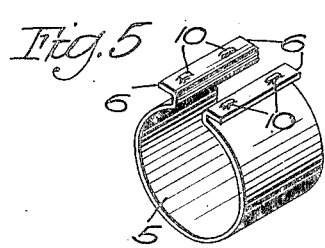
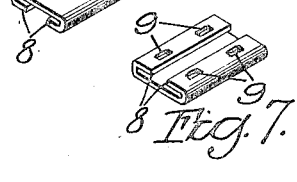
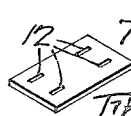
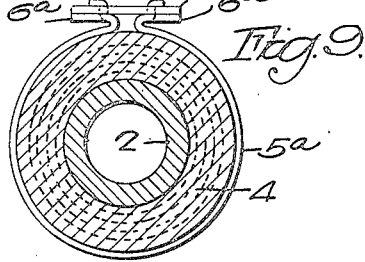
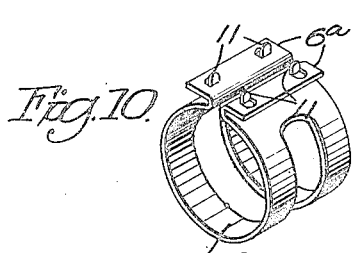
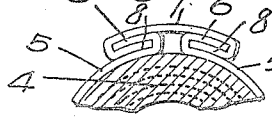
Inventor—
Nicholas A. Petry.
by his Attorneys Patented Aug. 7, 1923.

1,464,335

UNITED STATES PATENT OFFICE.

NICHOLAS A. PETRY, OF PHILADELPHIA, PENNSYLVANIA.

HOSE CLAMP.

Application filed March 29, 1921. Serial No. 456,774.

*To all whom it may concern:*

Be it known that I, NICHOLAS A. PETRY, a citizen of the United States, residing in Philadelphia, Pennsylvania, have invented certain Improvements in Hose Clamps, of which the following is a specification.

The object of my invention is to provide a comparatively cheap and effective clamp especially adapted for securing air-pressure hose to terminal pipes and nozzles of air pumps used for the purpose of inflating automobile tires, but it will be understood that the clamp can be used for clamping hose to any connecting pipe without departing from the essential features of the invention.

In the accompanying drawings:

Fig. 1 is a perspective view of the lower portion of an air pump showing an air hose attached thereto by my improved clamp;

Fig. 2 is a longitudinal sectional view on the line 2—2, Fig. 3;

Fig. 3 is an enlarged sectional view on the line 3—3, Fig. 2;

Fig. 4 is a view showing the clamp located on the hose prior to being contracted and secured by the locking plate;

Fig. 5 is a perspective view of the clamp;

Figs. 6 and 7 are perspective views of the locking plate;

Fig. 8 is a sectional view, similar to Fig. 3, showing the locking plate bent down onto the clamp;

Fig. 9 is a sectional view illustrating a modification;

Fig. 10 is a perspective view of the modified clamp shown in Fig. 8; and

Fig. 11 is a perspective view of the locking plate used in connection with the clamp illustrated in Fig. 10.

Referring to the drawings, 1 illustrates the lower end of an air pump used for inflating automobile tires. This pump has a terminal pipe 2, preferably provided with rounded ribs 3. 4 is a rubber hose, which is forced over the terminal pipe 2. 5 is a sheet metal clamping member, which is placed on the hose, preferably in line with the ribs 3 of the terminal pipe 2. The ends of this clamping member are bent, as at 6, to form lateral parallel flanges.

In order to secure the clamp firmly to the hose, a tool is applied to the clamp, when on the hose, which compresses the clamp and the rubber hose from the position shown in Fig. 4 to that shown in Fig. 3. A locking plate 7 is then slipped over the end of the clamp. This locking plate is rectangular and has inturned flanges, which form channels for the reception of the flanges 6 of the clamp. When the plate is in position it holds the clamping member rigidly on the hose. The plate does not have to be forced in position and does not act to draw the clamp onto the hose, but acts only to hold the clamping member after adjustment.

In order to prevent the longitudinal movement of the locking plate, slight projections 9 are formed on the flanges 8 of the locking plate and recesses, as indicated at 10, are formed on the under side of the flanges 6 of the clamp so that when the locking plate is forced into position, the projections 9 enter the recesses 10 and lock the plate against longitudinal movement. After this, if found necessary, the edges of the locking plate can be forced down onto the body of the clamp, as illustrated in Fig. 8, in order to reduce the projecting portion as much as possible.

In Fig. 9, I have illustrated a modification in which the flanges 6ª of the clamp 5ª have projections 11 pressed up from the body of each flange and the locking plate 7ª has openings 12 corresponding to the projections 11 so that when the clamp 5ª is applied to the hose and compressed, the locking plate 7ª is placed between the flanges 6ª so that the projections 11 extend through the openings 12, after which the projections are bent down, as shown in Fig. 9, firmly holding the locking plate to the clamp.

I claim:

The combination in a hose clamp, of a substantially circular flexible clamping member having flanges at the ends bent back over the body of the clamp; and a locking member having inturned flanges arranged to be forced onto the flanges of the clamping member when said member has been applied to the hose; with projections on one of said members cooperating with recesses in the other member to lock the members in the clamping position.

NICHOLAS A. PETRY.